No. 633,369. Patented Sept. 19, 1899.
C. ROUSSET.
AUTOMOTOR HORSE.
(Application filed Apr. 21, 1899.)
(No Model.) 2 Sheets—Sheet 1.
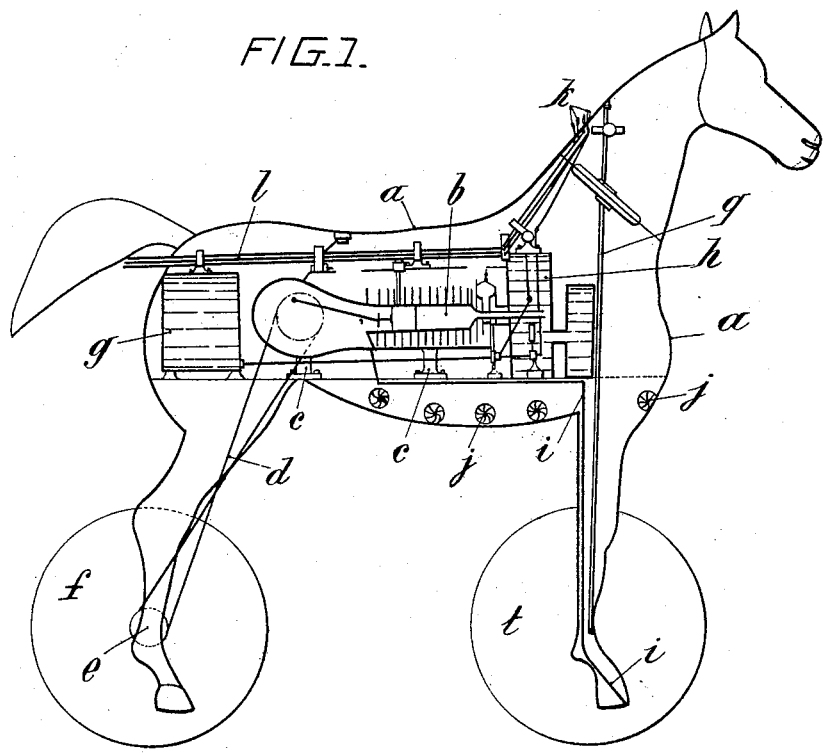
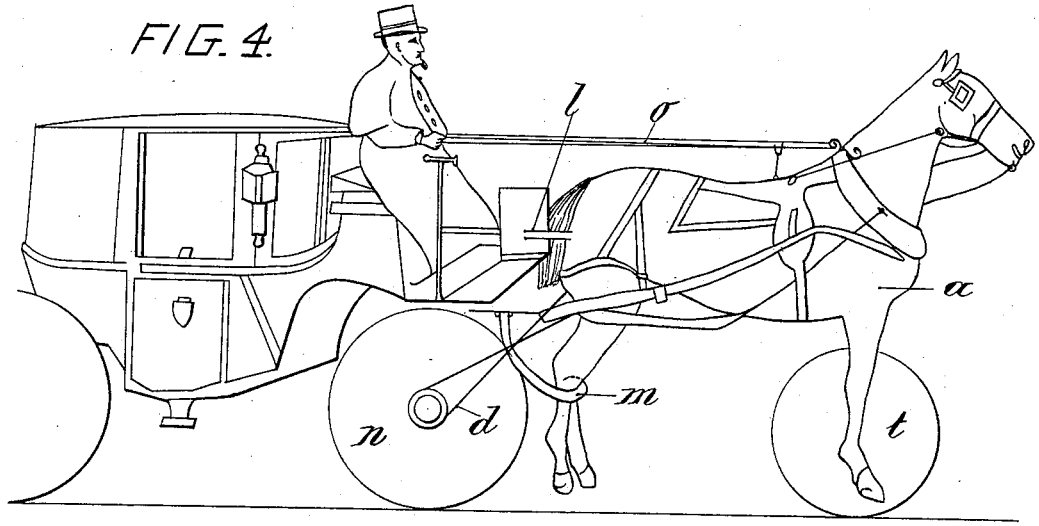

No. 633,369. Patented Sept. 19, 1899.
C. ROUSSET.
AUTOMOTOR HORSE.
(Application filed Apr. 21, 1899.)
(No Model.) 2 Sheets—Sheet 2.

United States Patent Office.

CONSTANCE ROUSSET, OF ROZOY, FRANCE, ASSIGNOR TO EMILE LANGRENNE, OF SAME PLACE.

AUTOMOTOR-HORSE.

SPECIFICATION forming part of Letters Patent No. 633,369, dated September 19, 1899.

Application filed April 21, 1899. Serial No. 713,995. (No model.)

*To all whom it may concern:*

Be it known that I, Madame LÉON ROUSSET, *née* CONSTANCE LANGRENNE, gentlewoman, of Rozoy, Commune d'Aougny par Ville en Cardenois, Marne, France, have invented an Improved Automotor-Horse, of which the following is a full, clear, and exact description.

This invention relates to a motor-propelled horse for saddle or draft purposes.

Reference is to be had to the accompanying drawings, in which—

Figure 2:
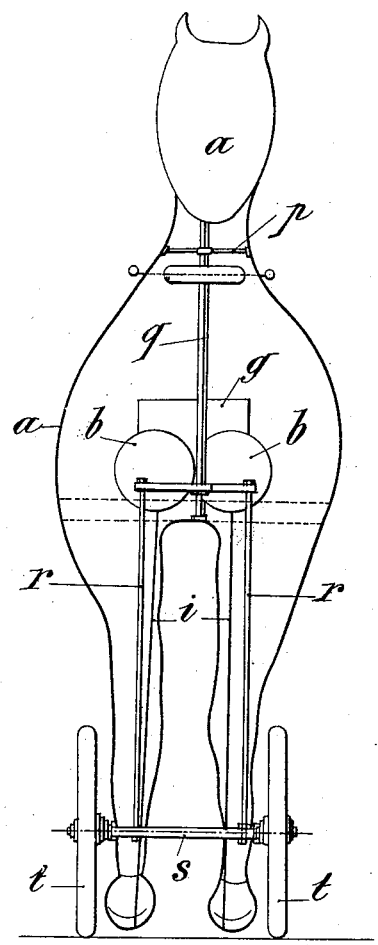
Figure 3:
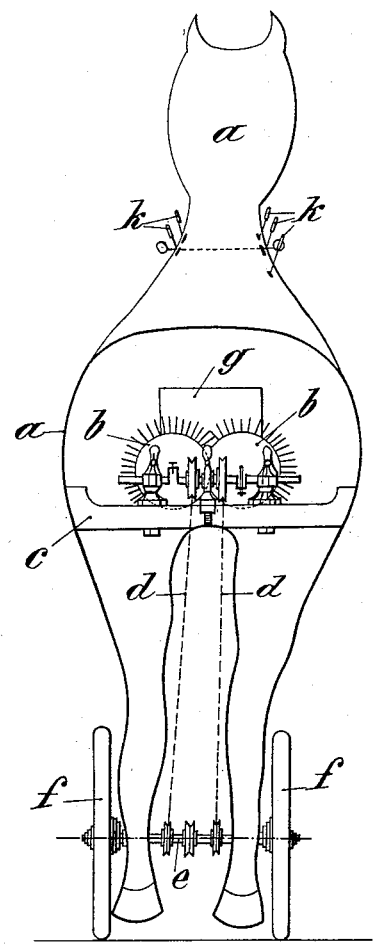

Figure 1 is a longitudinal vertical section, and Figs. 2 and 3 face and rear views, of the motor-propelled horse. Fig. 4 shows the horse attached to a carriage.

The same letters of reference denote like parts in the several figures.

The motor mechanism is contained in the body $a$ of the horse, which may be made of metal, wood, or other material and be covered with skin, so as to present the appearance of a live horse harnessed in the usual way.

The mechanism comprises one or a pair of motors $b$, supported upon cross-bars $c$ and driving through chains or belts $d$ the shaft $e$ of the driving-wheels $ff$, mounted on the hind legs of the horse, as shown in Figs. 1, 2, and 3.

Within the body $a$ are a feed-reservoir $g$ and carbureter $h$, the exhaust-pipes $i$ for the products of combustion passing down to the hoofs of the fore legs, as shown in Figs. 1 and 2.

The motors are cooled by means of air admitted at air-inlet holes $j$ in the belly and chest.

The starting, stopping, steering, and brake gears are controlled by means of handles $k$ upon the neck in the case of a saddle-horse or by means of rods $l$ within reach of the driver in the case of a draft-horse, as shown in Fig. 4. In this latter case the front wheels $n$ of the vehicle would be the driving-wheels, the wheels $f$ being removed and the horse supported by arms $m$, fixed to the vehicle.

The steering is effected by means of reins or rods $o$, held by the rider or driver, the neck of the horse being for this purpose intersected and mounted upon ball-bearings, the reins $o$ being attached to a cross-head $p$, mounted on a vertical spindle $q$, to the lower end of which are attached arms $r$, contained within the fore legs and connected to the axle $s$ of the front wheels $t$.

Concealed openings are provided in the body for access to the motors for inspection, cleaning, and lubricating, and the motor-horse hereinbefore described can be started either by a rider or driver having at hand the means for steering or stopping the horse.

The forms, dimensions, details, and materials employed in the construction of my improved motor-horse may be varied without in any way affecting the principle of the invention.

I claim—

A motor-propelled horse adapted to be ridden or driven, the said motor-propelled horse comprising a casing $a$ in the form of a horse and having a movable head, motor mechanism $b$ fed by a reservoir $g$ and a carbureter $h$ contained within said casing, hand-operated means carried by the horse for controlling the motor mechanism, driving and steering wheels, intermediate mechanism between the motor mechanism and the driving-wheels, intermediate mechanism between the movable head of the horse and the steering-wheels and reins connected to the movable head of the horse, whereby when the horse's head is turned by the rider or driver, the steering-wheels will be turned in a like manner to steer the device.

The foregoing specification of my improved automotor-horse signed by me this 18th day of March, 1899.

CONSTANCE ROUSSET.

Witnesses:
EDWARD P. MACLEAN,
MAURICE HENRI SIGNET.